(12) United States Patent
Yamada et al.

(10) Patent No.: US 6,636,008 B2
(45) Date of Patent: Oct. 21, 2003

(54) ELECTRIC CAR CONTROLLER AND CONTROL METHOD

(75) Inventors: Hiroyuki Yamada, Hitachinaka (JP); Minoru Kaminaga, Hitachinaka (JP); Takuma Nomura, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 2 days.

(21) Appl. No.: 10/107,074

(22) Filed: Mar. 28, 2002

(65) Prior Publication Data
US 2003/0085678 A1 May 8, 2003

(30) Foreign Application Priority Data
Nov. 7, 2001 (JP) .......................... 2001-341790

(51) Int. Cl.[7] .............................................. H02K 23/00
(52) U.S. Cl. ..................... 318/254; 318/727; 318/490; 318/805
(58) Field of Search ................................ 318/727, 490, 318/805, 450, 254, 439, 138, 432, 434, 433

(56) References Cited

U.S. PATENT DOCUMENTS 6,556,464 B2 * 4/2003 Sakai et al. ................. 318/727
6,566,840 B1 * 5/2003 Wu et al. .................... 318/727
6,570,358 B2 * 5/2003 Nakatsugawa et al. ..... 318/727

FOREIGN PATENT DOCUMENTS

JP 9-172791 6/1997
JP 2000-116176 4/2000

* cited by examiner

*Primary Examiner*—Karen Masih
(74) *Attorney, Agent, or Firm*—Crowell & Moring LLP

(57) ABSTRACT

The electric car controller is characterized in that evaluation two-phase/three-phase converting means (15) for calculating a three-phase evaluation current indication value is provided in control means, and current detected value from current detecting means (8) and evaluation current indication value are compared with each other by a deviation computing means (17). This result is evaluated by error evaluation means (18), and is sent to target command computing means (10), whereby the operation of a drive apparatus is stopped or continued.

16 Claims, 10 Drawing Sheets

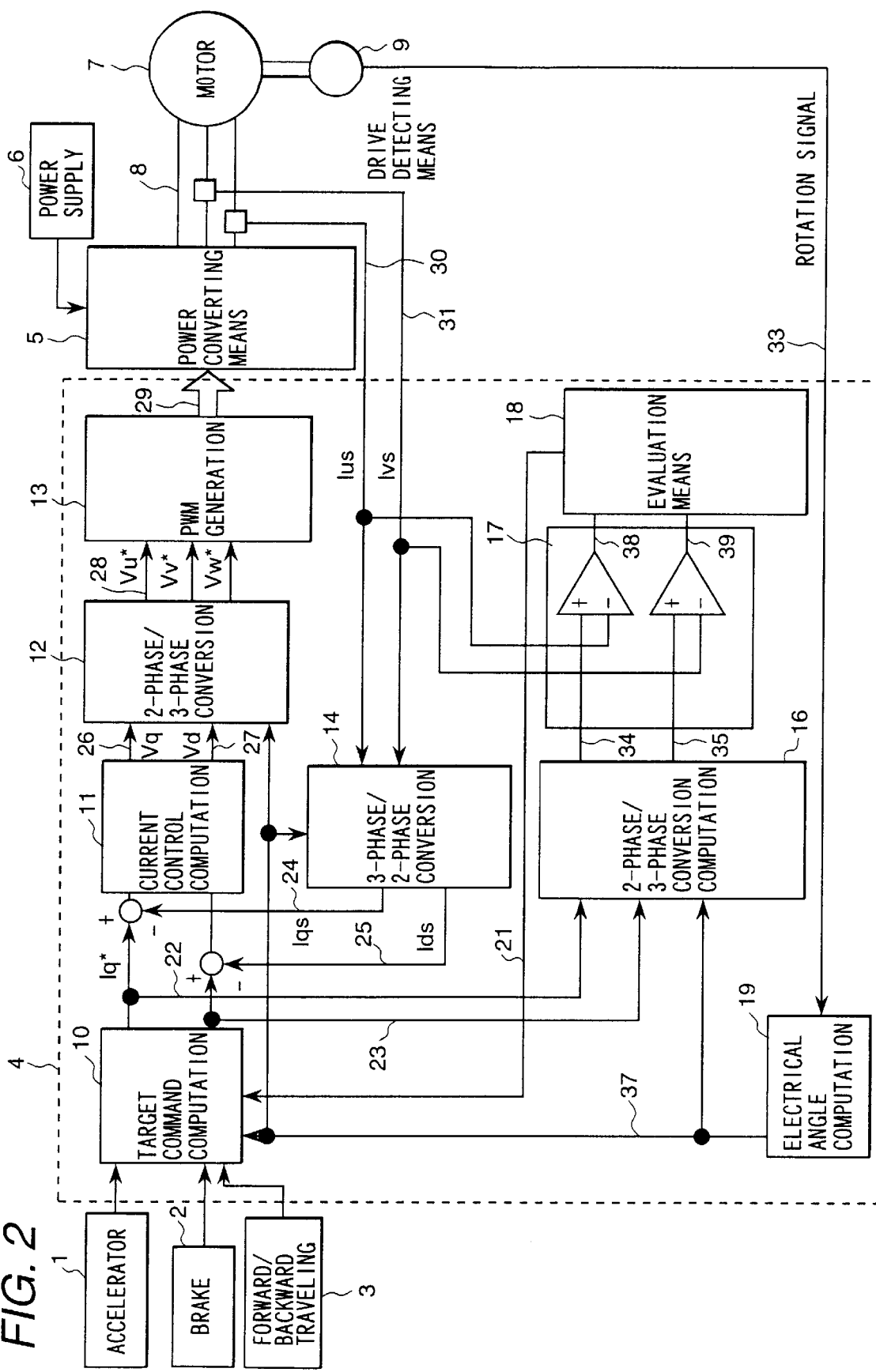

FIG. 3

$$IU^* = \sqrt{2}\sin(\theta + \pi/2) \cdot Id^* \cdot \sqrt{2}\sin\theta \cdot Iq^* \qquad \cdots \text{EQUATION(1)}$$

$$Iv^* = -\sqrt{2}\sin(\theta + 5\pi/6) \cdot Id^* + \sqrt{2}\sin(\theta + \pi/3) \cdot Iq^* \qquad \cdots \text{EQUATION(2)}$$

WHERE  $\theta$ : ELECTRICAL ANGLE

FIG. 4

$$Iu^* = \sqrt{2} \cdot \sqrt{Id^{*2} + Iq^{*2}} \cdot \sin(\theta) \qquad \cdots \text{EQUATION(3)}$$

$$Iv^* = \sqrt{2} \cdot \sqrt{Id^{*2} + Iq^{*2}} \cdot \sin(\theta + \pi) \qquad \cdots \text{EQUATION(4)}$$

WHERE  $\theta$ : ELECTRICAL ANGLE

FIG. 5
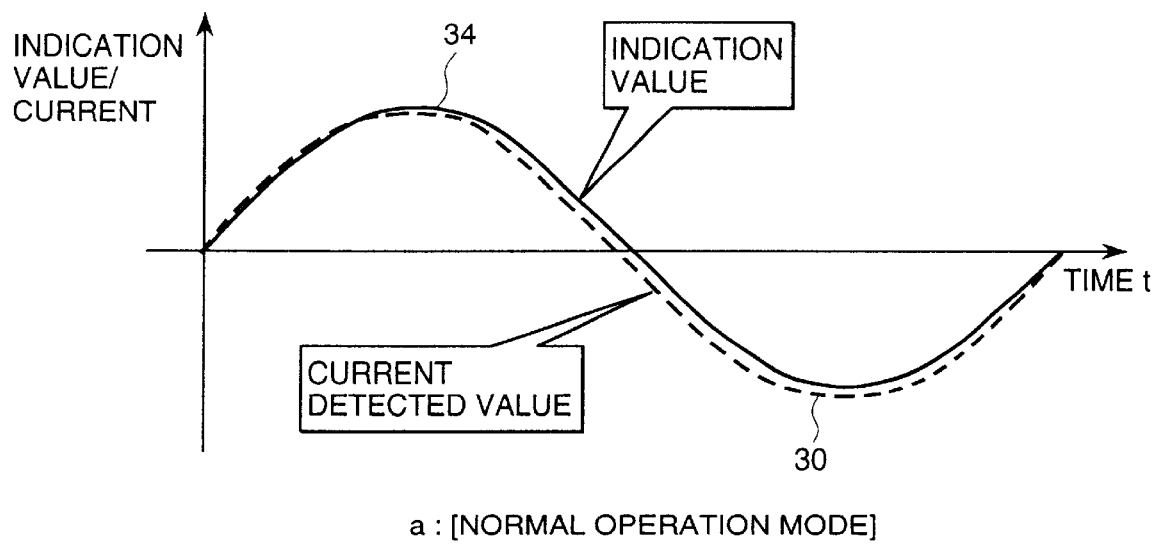
a : [NORMAL OPERATION MODE]
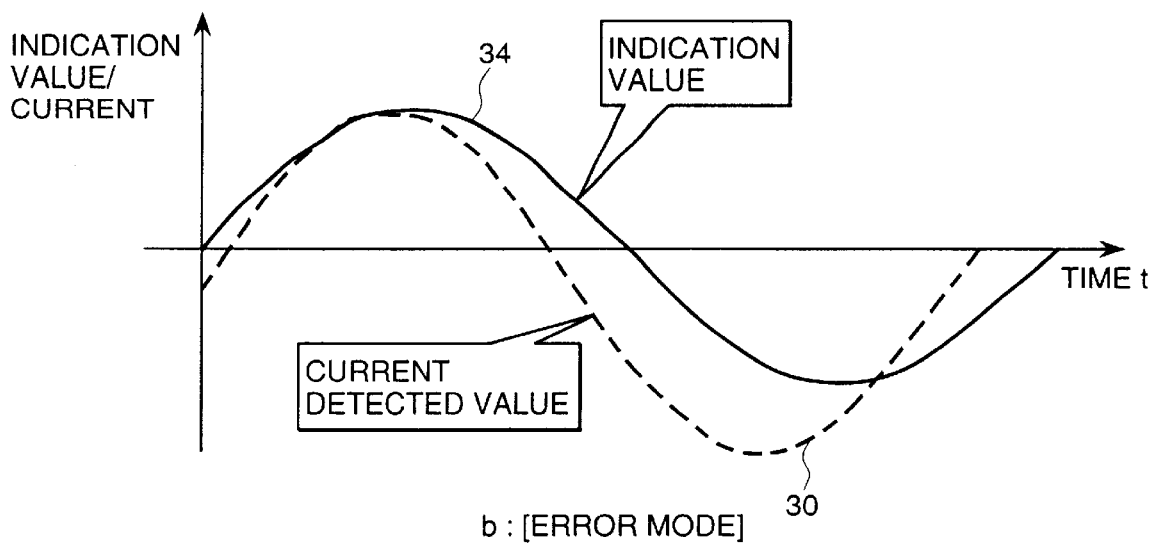
b : [ERROR MODE]

FIG. 8

| ERROR MODE | U-PHASE EVALUATION | V-PHASE EVALUATION | W-PHASE EVALUATION | MODE DATA | DRIVE APPARATUS MODE FLAG 21 | PROCESSING BY CURRENT SELECTING MEANS 16 |
|---|---|---|---|---|---|---|
| NORMAL | ○ | ○ | ○ | 0 | SET TO NORMAL OPERATION MODE | NORMAL |
| W-PHASE ERROR | ○ | ○ | × | 1 | SET TO DRIVE RESTRICTION (WITH OUTPUT RESTRICTION, ERROR DISPLAY, ETC.) | Iw=-Iu-Iv |
| V-PHASE ERROR | ○ | × | ○ | 2 | | Iv=-In-Iw |
| U-PHASE ERROR | × | ○ | ○ | 3 | | Iu=-Iv-Iu |
| U AND V PHASE ERROR | × | × | ○ | 4 | DRIVE STOP | NO PROCESSING |
| U AND W PHASE ERROR | × | ○ | × | 5 | | NO PROCESSING |
| V AND W PHASE ERROR | ○ | × | × | 6 | | NO PROCESSING |

ELECTRIC CAR CONTROLLER AND CONTROL METHOD

BACKGROUND OF THE INVENTION

1. Field of the Invention

The present invention relates to an electric car controller and more particularly to the apparatus and method for detecting an error of current detecting means for detecting the current of an alternating current motor.

2. Description of Prior Art

A controller for detecting an error of current detecting means in an alternating current motor driving apparatus is disclosed in JP A 09-172791 and JP A 2000-116176, for example.

The JP A 09-172791 discloses a technique, wherein an alternating current motor is controlled according to the voltage command value of the voltage to be applied to the motor or current command value representing instantaneous current by making reference to the current value of the motor detected by a current sensor, and comparison is made between the current value of the motor detected by the current sensor and the motor current value estimated from the voltage command or current command value, whereby evaluation is made to determine that an error has occurred to the current sensor or related circuit and electric power system.

The JP A 2000-116176 describes a technique of using;

- a first estimating means for estimating the current of the remaining one phase based on the current detected value by controlling a three-phase alternating current motor and detecting 2-phase current through a current sensor for two phases, and
- a second estimating means for estimating the current for one phase from the current phase angle and current detected value for remaining two phases, whereby the first estimated current value and second estimated current value each are obtained, and they are compared with each other to evaluate an error of the current sensor.

In the aforementioned prior arts, the JP A 09-172791, for example, discloses the configuration of making a direction comparison between the detected value of an current sensor as alternating current and the voltage command value to be applied to a motor or instantaneous current command value. However, the controller also places under feedback control the current value detected by a current sensor, thereby ensuring that the current itself flowing to the motor will follow the command. In this configuration, control is made by making comparison between the current detected value and voltage command value or instantaneous current command value. If an error has occurred to the current sensor or electric power system, the controller provides feedback control to ensure that the current flowing to the motor will follow the voltage command value or instantaneous current command. As a result, when the output gain of the current sensor has reduced, for example, the feedback control of the controller is made to ensure that the voltage command value or current command value will be followed for the phase subjected to reduction in the output gain of the current sensor. As a result, excessive current may flow to that phase, or a balance between the current detected value and command value may be maintained ultimately. A sufficient consideration is not given especially to evaluation of a current sensor error, according to this prior art.

Similarly in the JP A 2000-116176, feedback control is made by making comparison and reference to the current command value and current detected value. The estimated current value used for error evaluation is based on the current value detected by the current sensor. Accordingly, when an error has occurred to the current sensor, there may be a case where a balance is kept between current command and current detected value. A current sensor error may not be evaluated.

SUMMARY OF THE INVENTION

An object of the present invention is to provide a electric car controller and control method capable of evaluating an error in a manner appropriate to each of various aspects of errors occurring to current detecting means.

Another object of the present invention is to provide an electric car controller and control method which allow continuous operation even if an error has occurred to current detecting means for one of three phases.

Still another object of the present invention is to eliminate the use of unnecessary current detecting means by allowing separate evaluation of each error of current detecting means, thereby ensuring reduction in the apparatus cost.

An electric car controller designed to attain the above object provides dq-axis vector current control for separate and independent control of primary current to be supplied to a stator of an alternating current motor based on a q-axis control current command value and a d-axis control current command value, and provides current feedback control by detecting the primary current of the aforementioned alternating current motor by current detecting means.

The aforementioned controller comprises;

- an operation processing unit for generating a control current command value based on a command value to supply it to the aforementioned alternating current motor and for performing current feedback control through detection by the aforementioned current detecting means and conversion by current converting means, and
- an evaluation processing unit for generating a current command value for evaluation and performing evaluation to see if the aforementioned current detecting means is normal or not. The aforementioned evaluation processing unit is characterized by comprising;
  - a step of generating an evaluation current command value for comparison and evaluation unaffected by the aforementioned current feedback and independently of the aforementioned control current command value, based on the aforementioned q-axis control current command value and the aforementioned d-axis control current command value using command value converting means,
  - a step of comparing between an alternating current detected value detected by the aforementioned current detecting means without being converted by the aforementioned current converting means and the aforementioned evaluation current command value, and
  - a step of determining that the aforementioned current detecting means is incorrect if the result of comparison has exceeded a threshold value.

In the present invention, it is preferred that the current indication value for the aforementioned evaluation be calculated for any desired combination of two phases out of three, and the aforementioned alternating current detected value be a detected value for any desired two phases out of three. The aforementioned two-phase evaluation current indication value and alternating current detected value are compared with each other separately for each phase. If an error is found in either one or both of two phases, then the operation of the aforementioned electric car controller is suspended.

In the present invention, it is preferred that the aforementioned evaluation current indication value be calculated for three phases, and the aforementioned alternating current detected value be a detected value for three phases. The aforementioned three-phase evaluation current indication value and alternating current detected value are compared with each other separately for each phase. If an error is found in any one or both of three phases, then the estimated detection value of the aforementioned alternating current for the affected phase is calculated and generated based on the aforementioned alternating current detected value for the remaining two phases whereby the operation of the aforementioned electric car controller is restricted or continued.

In the present invention, it is preferred that the operation of the aforementioned electric car controller be suspended if an error is found in two of three phases or in all the three phases.

The present invention is further characterized by an electric car control method comprising;
  a step of regulating the amplitude and phase of the primary current to be supplied to an alternating current motor and controlling the speed or torque of said alternating current motor, by dq-axis vector current control which provides separate and independent control of the primary current supplied to the stator of said alternating current motor, namely, a q-axis current component as a torque component based on a q-axis control current command value and a d-axis current component as an exciting component based on a d-axis control current command value,
  a step of applying said primary current to said alternating current motor and controlling it through electric power converting means, and
  a step of detecting said primary current to said alternating current motor an alternating current detected value through current detecting means:
  said electric car control method comprising;
  a step of providing feedback current control by detecting said primary current as a q-axis current detected value and a d-axis current detected value and converting it through current converting means, and by comparing between said q-axis control current command value and said q-axis current detected value, and between said d-axis control current command value and said d-axis current detected value,
  a step of generating an evaluation current command value for comparison and evaluation independently of said feedback control current command value based on said q-axis control current command value and said d-axis control current command value,
  a step of comparing said alternating current detected value as an alternating current component detected by said current detecting means without being converted, and said evaluation current command value, and
  a step of determining that said current detecting means is incorrect if the result of comparison exceeds a threshold value.

According to the present invention, an evaluation current command value independently of the current command value for feedback control is generated. This is compared with the alternating current detected value as an alternating current component detected by current detecting means without being converted, and evaluation is made. Thus, the present invention provides an electric car controller and control method capable of adequate evaluation of an error in response to each of various troubles occurring to current detecting means.

BRIEF DESCRIPTION OF THE DRAWINGS

FIG. 2 is a block diagram representing the processing function of the controller as a first embodiment of the present invention;

FIG. 3 shows an example of the two-phase/three-phase conversion indication value in a controller as a first embodiment of the present invention;

FIG. 4 shows a second example of the two-phase/three-phase conversion indication value in a controller as a first embodiment of the present invention;

FIG. 5 is a diagram representing an example of the input signal of a deviation computing means in a controller as a first embodiment of the present invention;

FIG. 8 shows an example of three-phase signal evaluation in a controller as a second embodiment of the present invention;

DESCRIPTION OF THE PREFERRED EMBODIMENTS

Figure 1:
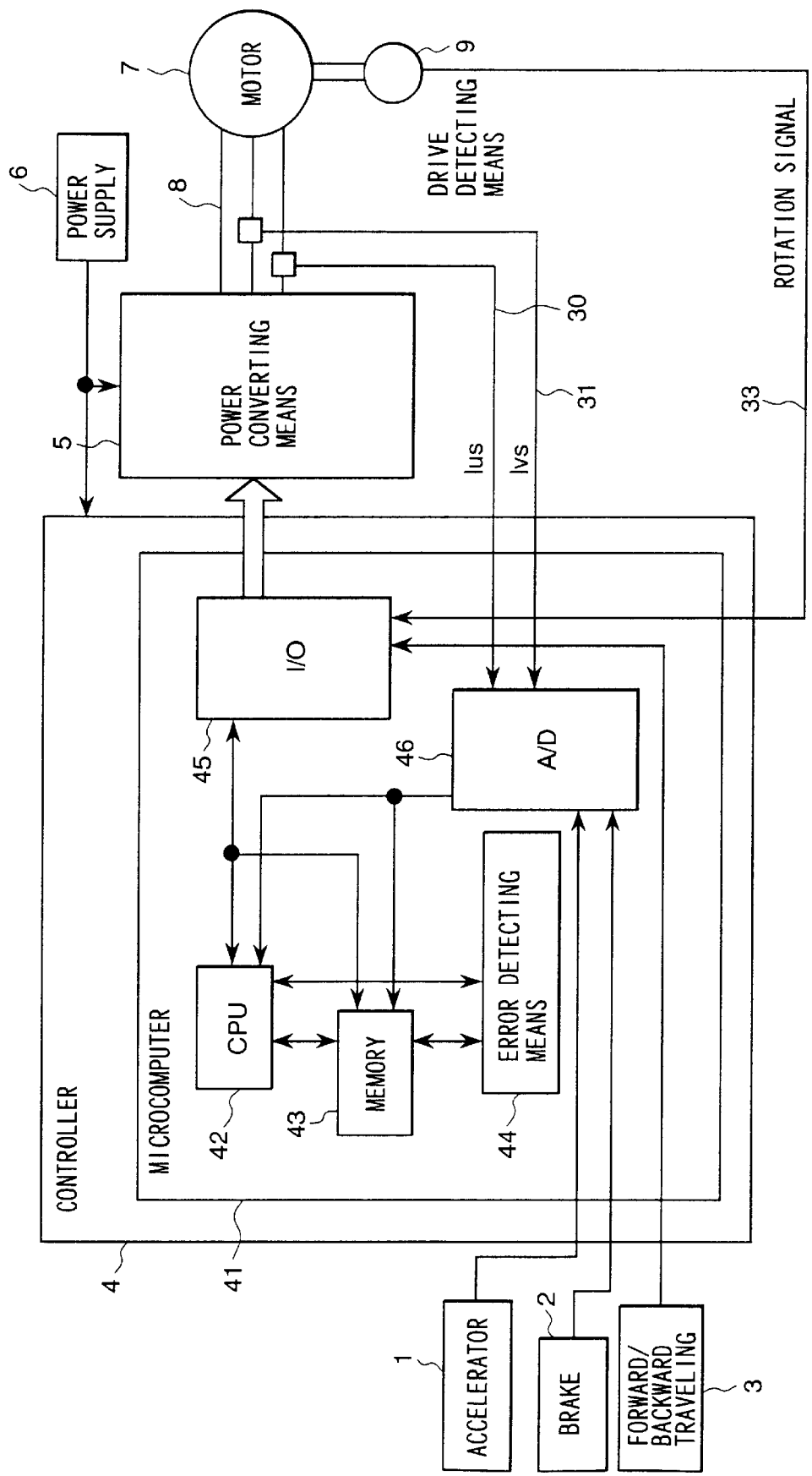
FIG. 1 is a block diagram representing an example of the configuration of an electric car controller as a first embodiment according to the present invention.

The following provides a detailed description of preferred embodiments of an electric car controller according to the present invention with reference to drawings:

FIG. 1 is a block diagram representing a first embodiment of an electric car controller according to the present invention. The electric car controller according to the present invention comprises a control means 4, an electric power converting means 5 a power supply 6, motor 7, etc. The control means 4 has a built-in microcomputer 41, which incorporates a CPU42, a memory means 43, an error detecting means 44, an input/output means 45 and an A/D converting means 46. The memory means 43 stores the programs for motor operation control and detection of various errors.

The motor 7 has a built-in drive detecting means 9 for detecting rotation, and the detected drive speed is sent to the microcomputer 41 as a drive signal 33. In the microcomputer 41, signals from accelerator detecting means 1 and brake detecting means 2 and signals of U-phase current detection value 30 and V-phase current detected value 31 are detected by A/D converting means 46, and are transmitted to the CPU42 or memory means 43. A signal from forward/backward travel selecting means 3 and drive detection signal 33 are detected by input/output means 45 and are sent to the CPU42 or memory means 43 in the same manner.

Based on the various signals having been transmitted, the CPU42 calculates electric power to be fed to the motor 7, and drives electric power converting means 5 through input/output means 45. It converts electric power of power supply 6 into the form suitable for supply to the motor 7, and supplies it to the motor 7. In response to the electric power supplied, the motor 7 generates a drive force for driving an electric car, whereby the car is driven.

Electric power supplied to the motor 7 is detected by current detecting means 8 as a current, and is transmitted to the microcomputer 41 as U-phase current detected value 30 and V-phase current detected value 31, thereby performing current feedback control. The CPU42 of microcomputer 41 is also equipped with an error detecting means 44. Error detection, especially, detection of an error of the current detecting means 8 is performed in response to the signal from the memory means 43 and access from the CPU42.

FIG. 2 is a block diagram representing control means 4 in FIG. 1 to facilitate description of the function executed by the microcomputer 41. In FIG. 2, control means 4 comprises (1) an operation processing unit for generating a control current command value according to a command value, sending it to the motor 7 and performing current feedback control, and (2) an evaluation processing unit for generating an evaluation current command value and determining if current detecting means is normal or not.

Of the aforementioned units, the operation processing unit includes the functions of a target command computing means 10, a current control means 11, a two-phase/three-phase converting means 12, a PWM generating means 13, a three-phase/two phase converting means 14 and an electrical angle computing means 19. In the meantime, the evaluation processing unit 14 incorporates the functions of two-phase/three phase converting means 15 for evaluation, deviation computing means 17 and evaluation means 18. In the evaluation processing unit, a current is detected by current detecting means 8 through the deviation computing means 17, and a current value without being converted by three-phase/two-phase converting means is compared with the output from the two-phase/three phase converting means 15 for evaluation. Based on this result, the evaluation means 18 determines if the current detecting means has any error or not.

In the target command computing means 10, target torque or target drive speed to be generated by the motor 7 are calculated according to the signals from an accelerator detecting means 1, a brake detecting means 2, a forward/backward travel selecting means 3 and computed electrical angle value 37. Then q-axis current command 22 and d-axis current command 23 as current commands to be supplied to motor 7 are calculated according to these target values.

The current flowing to the motor 7 is detected by current detecting means 8, and is transmitted to the three-phase/two phase converting means 14 as a U-phase current detected value 30 and V-phase current detected value 31. The three-phase/two phase converting means 14 converts the detected alternating current of the motor 7 into a dq-axis current value of the so-called Cartesian coordinates to calculate a q-axis current detected value 24 and d-axis current detected value 25. Feedback control is performed by comparison between the q-axis current command 22 and d-axis current command 23 and between the q-axis current detected value 24 and d-axis current detected value 25, and current control is performed by current control computation 11 based on this result, whereby the q-axis voltage command 26 and d-axis voltage command 27 is output. normal proportional plus integral compensation control or other control methods can be used for processing of this current control computation 11.

The q-axis voltage command 26 and d-axis voltage command 27 are input into a two-phase/three-phase converting means 12, where is converted into the three-phase voltage command from two-phase Cartesian coordinates. The result of conversion is transmitted to the PMW generating means 13 as a three-phase voltage command 28, and a PWM command 29 is generated to drive the electric power converting means 5, whereby electric power converting means 5 is operated. Based on the signal of PWM command 29, electric power converting means 5 uses PWM conversion to convert the electric power of the power supply 6 into the alternating current which can be fed to the motor 7, which is then fed to the motor 7. The aforementioned q-axis current command 22 and d-axis current command 23 are also sent to the two-phase/three phase converting means 15 for evaluation. Based on the input q-axis current command 22 and d-axis current command 23, two-phase/three phase converting means 15 for evaluation performs coordinate conversion, and calculates the U-phase evaluation current command value 34 as an alternating current component and V-shaped evaluation current command value 35, and outputs them.

FIG. 3 shows an example of the two-phase/three-phase conversion indication value of a controller as a first embodiment of the present invention.

The two-phase/three-phase conversion indication value is compared with the current detected value from the current detecting means 8. This value is generated in the route where the current supplied to the motor 7 is not affected. Accordingly, even if any error occurs to current detecting means 8 and any one of the U-phase current detected value 30, V-phase current detected value 31 and W-phase current detected value 32 is abnormal, it can be treated as a value not affected by this feedback signal. Based on the q-axis current command 22 and d-axis current command 23, this can be obtained from the following equation (1) and (2):

$$IU^* = \sqrt{2}\sin(\theta + \pi) \cdot Id^* - \sqrt{2}\sin\theta \cdot Iq^* \qquad (1)$$

$$Iv^* = -\sqrt{2}\sin(\theta + 5\pi/6) \cdot Id^* + \sqrt{2}\sin(\theta + \pi/3) \cdot Iq^* \qquad (2)$$

where $\Delta t$ denotes an electrical angle. This calculation can be performed in high-speed multi-point mode approximately at every frequency of switching of the electric power converting means 5, or can be performed synchronously with calculation of the target command computing means 10. The value need not necessarily indicate an instantaneous value of alternating current.

FIG. 4 shows a second example of the two-phase/three-phrase controller as a first embodiment of the present invention.

The two-phase/three-phase conversion indication value can be obtained by the method shown in FIG. 4 in addition to the computing method based on the aforementioned so-called two-phase/three-phase coordinate conversion. This is also be obtained from the following Equations (3) and (4):

$$Iu^* = \sqrt{2} \cdot \sqrt{Id^{*2} + Iq^{*2}} \cdot \sin(\theta) \quad (3)$$

$$Iv^* = \sqrt{2} \cdot \sqrt{Id^{*2} + Iq^{*2}} \cdot \sin(\theta + \pi) \quad (4)$$

where Δt denotes an electrical angle. Similarly to the description with reference to FIG. 3, this calculation can be performed in high-speed multi-point mode approximately at every frequency of switching of the electric power converting means 5, or can be performed synchronously with calculation of the target command computing means 10. The value need not necessarily indicate an instantaneous value of alternating current.

The U-phase evaluation current command value 34 and V-phase evaluation current command value 35 are generated from the q-axis current command 22 and d-axis current command 23, and are independent of the current actually flowing to the motor 7. Needless to say, it is not affected by the state of the current flowing to the motor 7.

The U-phase evaluation current command value 34 and V-phase evaluation current command value 35 are transmitted to the deviation computing means 17, and U-phase current detected value 30, U-phase evaluation current command value 34, V-phase current detected value 31 and V-phase evaluation current command value 35 are compared by this deviation computing means 17.

This comparison can be made by finding the absolute value of each of U-phase evaluation current command value 34 and V-phase evaluation current command value 35, and U-phase current detected value 30 and V-phase current detected value 31, and by obtaining a difference between the U-phase evaluation current command value 34 and the U-phase current detected value 30, and a difference between the V-phase evaluation current command value 35 and V-phase current detected value 31, whereby the results are compared with a threshold value.

Alternatively, the comparison can be made by obtaining a difference of the combinations between the U-phase evaluation current command value 34 and U-phase current detected value 30, and a difference of the combination between the V-phase evaluation current command value 35 and V-phase current detected value 31. Then the absolute values of the results are found and are compared with a threshold value. Still alternatively, it is also possible to find a difference between the U-phase evaluation current command value 34 and U-phase current detected value 30, and a difference between the V-phase evaluation current command value 35 and V-phase current detected value 31. The results can be directly compared with a threshold value.

In any of the comparison methods, the difference value to be compared with the threshold value is compared with the threshold value using an average of multiple results of computing differences. Alternatively, it is also possible to make comparison after the results of computing differences have been treated by a primary delay filter or the like, thereby reducing the possibility of an detection error caused by noise.

The result of comparison is sent to the error evaluation means 18. The error evaluation means 18 compares it with the threshold value for each of the U-phase and V-phase, based on the result of comparison according to the deviation computing means 17, and determines if there is any error or not. If there is an error such as the deviation being equal to or higher than, then the error is assumed to have been occurred to the system of current detecting means 8 for that phase, and setting of a drive apparatus mode flag 21 is performed.

In this case, the drive apparatus mode flag 21 is set so as to stop the drive apparatus. This drive apparatus mode flag 21 is transmitted to the target command computing means 10. When the drive apparatus is set to the stop mode according to this drive apparatus mode flag 21, the target command computing means 10 suspends the computation of the target command value and resets the q-axis current command 22 and d-axis current command 23. Taking other related measures, it stops the drive apparatus operation and suspends supply of electric power to motor 7.

FIG. 5 is a drawing representing an example of the input signal of the deviation computing means 17 in a controller as a first embodiment of the present invention.

The U-phase current detected value 30 as a signal from the aforementioned current detecting means 8, V-phase current detected value 31 and W-phase current detected value 32 are input into the deviation computing means 17. Further, U-phase evaluation current command value 34, V-phase evaluation current command value 35 and W-phase evaluation current command value 36 based on computation according to the aforementioned equations (1) and (2) or the aforementioned equations (3) and (4) are also input by the two-phase/three phase converting means 15 for evaluation. These current detected value and current indication value are compared by the deviation computing means 17.

As illustrated in Figure, if the operation is normal, U-phase evaluation current command value 34 and U-phase current detected value 30 exhibit waveforms relatively similar to each other, for example, and operation is performed with almost the same waveforms in point of amplitude and phase. If any error has occurred to the U-phase current detecting means 8, the amplitude and/or phase of the signal of U-phase current detected value 30 will exhibit differences from those of the U-phase evaluation current command value 34. The deviation computing means 17 compares the discrepancies between the U-phase evaluation current command value 34 and U-phase current detected value 30, and performs computations. This result is sent to the error evaluation means 18, and operation is carried out in such a way as to determine if an error has occurred to the current detecting means 8 or not. This comparison and evaluation are also carried out for other V-phase and W-phase in the same manner. Comparison and evaluation are carried out independently for each of the U, V and W phases, with the result that error evaluation is performed for each phase without being affected by the operation of other phase.

Figure 6:
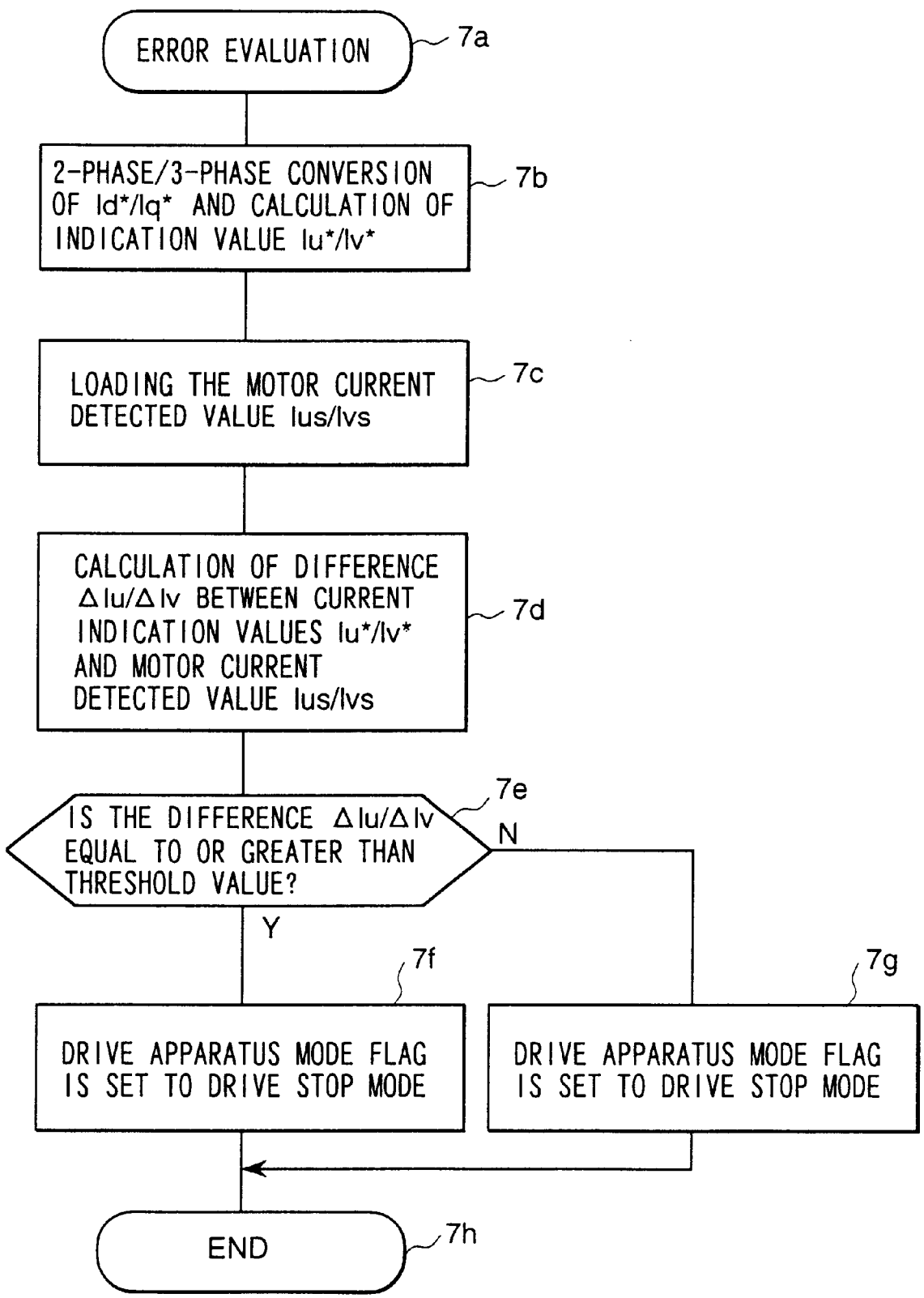
FIG. 6 is a flow chart representing an error evaluation method for two-phase signals in a controller as a first embodiment of the present invention.

FIG. 6 is a flow chart representing an error evaluation method for two-phase signals in a controller as a first embodiment of the present invention.

In step 7b, the U-phase evaluation current command value 34 and V-phase evaluation current command value 35 are computed based on the values of q-axis current command 22 and d-axis current command 23. In the next step 7C, U-phase evaluation current command value 34 and V-phase evaluation current command value 35 are loaded based on the signal sent from the current detecting means 8. In the next step 7d, difference ΔIu is computed from the U-phase evaluation current command value 34 and U-phase evaluation current command value 34, and difference ΔIv is computed from V-phase evaluation current command value 35 and V-phase evaluation current command value 35.

In this computation, it is also possible to find the absolute value of each of the U-phase evaluation current command value 34 and V-phase evaluation current command value 35, and the U-phase current detected value 30 and V-phase current detected value 31, and to obtain the difference between the U-phase evaluation current command value 34 and U-phase current detected value 30, and difference between the V-phase evaluation current command value 35 and V-phase current detected value 31, whereby the results are assigned with ΔIu and ΔIv, respectively.

Alternatively, it is also possible to obtain a difference of the combination between the U-phase evaluation current command value 34 and U-phase current detected value 30, and a difference of the combination between the V-phase evaluation current command value 35 and V-phase current detected value 31. Then the absolute values of the results are found and are assigned with ΔIu and ΔIv, respectively. Still alternatively, it is also possible to find a difference between the U-phase evaluation current command value 34 and U-phase current detected value 30, and a difference between the V-phase evaluation current command value 35 and V-phase current detected value 31. The results can be directly assigned with ΔIu and ΔIv, respectively.

In any of the comparison methods, ΔIu and ΔIv are determined using an average of multiple results of computing differences, or ΔIu and ΔIv are determined after the results of computing differences have been treated by a primary delay filter or the like. This procedure can reduces the possibility of an detection error caused by noise.

In step 7e, ΔIu and ΔIv obtained in this manner are compared with a threshold value. If the result of this comparison is equal to or higher than the threshold value, processing goes to step 7f. If the threshold value is not reached, processing goes to step 7g. To determine if the threshold value is reached or not, it is also possible to integrate the state of an error and to include the number of times or error time in evaluation. When proceeding goes to step 7f, evaluation can be made to determine that an error has occurred to the current detecting means 8. Accordingly, the drive apparatus mode flag 21 is set to the state of drive stop, and processing takes place in such a way as to stop the electric power converting means 5 and motor 7. When processing goes to step 7g, evaluation can be made to determine that no error has occurred to the current detecting means 8. Thus, the drive apparatus mode flag 21 is set to the state of normal operation so that normal operation is continued.

When current detecting means 8 is provided for only two phases out of three, taking such steps will allow quick detection of an error has occurred to one of them, hence quick stopping of the electric power converting means 8 and motor 7, with the result that the reliability of a electric car controller can be improved. Further, even if only two current detecting means 8 are provided, this permits separate diagnosis of an error in current detecting means 8 for each phase. This makes it unnecessary to diagnose the current detecting means 8 for an error based on three-phase equilibrium. As a result, there is no need of mounting an extra current detecting means 8, and this signifies reduction in electric car controller costs.

The configuration described above allows error diagnosis separately for each of the U and V phases for the system of current detecting means 8, and permits the result of evaluation to be quickly reflected to stop the drive apparatus. Further, even if an error has occurred to the current detecting means 8 or the like, the U-phase evaluation current command value 34 and V-phase evaluation current command value 35 are not changed according to the feedback signal of the current detecting means 8. They are indication values based on the q-axis current command 22 and d-axis current command 23 calculated by the target command computing means 10. The q-axis current detected value 24 and d-axis current detected value 25 based on the signal of current detecting means 8 will change into indefinite values as the signal of the current detecting means 8 becomes abnormal. However, the U-phase evaluation current command value 34 and V-phase evaluation current command value 35 are not subjected to any change, so a reliable error evaluation is ensured by comparison between this U-phase evaluation current command value 34 and V-phase evaluation current command value 35, and between the U-phase current detected value 30 and V-phase current detected value 31.

Such a configuration allows separate evaluation of an error in each current detecting means 8 even if current detecting means 8 are provided only for two phases out of three, because it is independent of a diagnostic method based on the state of so-called three-phase equilibrium. This eliminates the need of mounting unnecessary current detecting means 8, and provides the effect of cutting down the apparatus cost.

Figure 7:
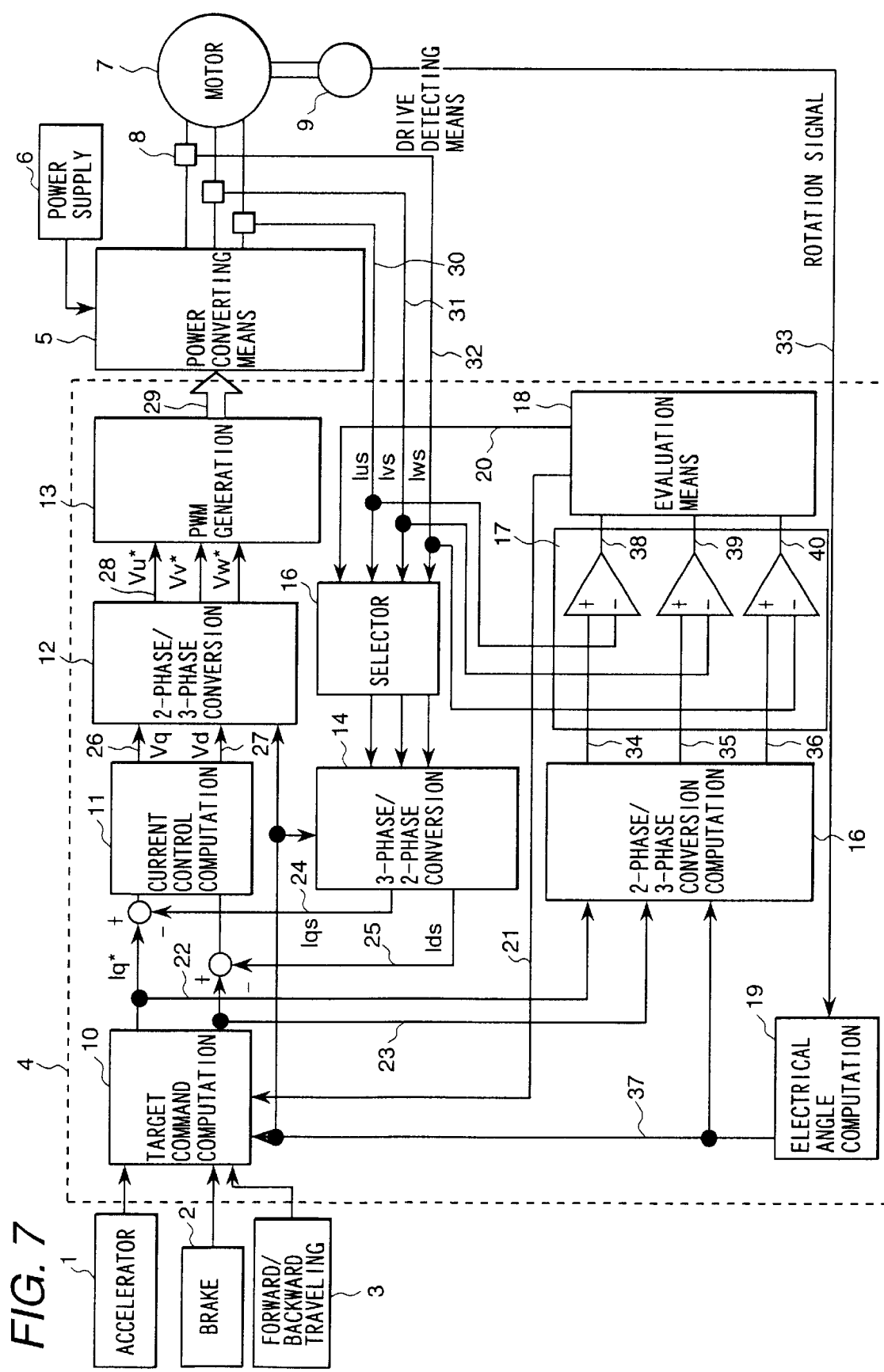
FIG. 7 is a block diagram representing the configuration of an electric car controller as a second embodiment of the present invention.

FIG. 7 is a block diagram representing an electric car controller as a second embodiment of the present invention.

In the second embodiment, current detecting means 8 is provided for each of three phases; U-phase, V-phase and W-phase. Similarly in this embodiment, U-phase evaluation current indication command 34, V-phase evaluation current indication command 35 and W-phase evaluation current command value 36 are calculated by two-phase/three phase converting means 15 for evaluation based on q-axis current command 22 and d-axis current command 23. The U-phase evaluation current indication command 34, V-phase evaluation current indication command 35, W-phase evaluation current command value 36 and are transmitted to the deviation computing means 17, and comparison is made between the U-phase current detected value 30 and U-phase evaluation for current command value 34, between the V-phase current detected value 31 and V-phase evaluation for current command value 35, and between W-phase current detected value 32 and W-phase evaluation current command value 36 by the deviation computing means 17. The results of comparison are send to the error evaluation means 18. In error evaluation means 18, comparison is made with the threshold value for each of U-phase, V-phase and W-phase based on the results of comparison obtained by the deviation computing means 17, and evaluation is made to determine if an error is present or not.

If there is an error, for example, of the deviation being greater than the threshold value, then an error is assumed to have occurred to the current detecting means 8 of the phase in question, and a drive apparatus mode flag 21 is issued. At the same time, a mode data 20 is generated and is sent to the current selecting means 16. In the current selecting means 16, if an error of current detecting means 8 is found in one of the three phases based on the data shown by the data mode 20, an alternative computation is made of the current detected value calculated for the affected phase according to the following three-phases equilibrium equation (5) from signals for two phases:

$$Iu+Iv+Iw=0 \tag{5}$$

Then the result is sent to the three-phase/two phase converting means 14. If an error occurs to current detecting means 8 in two phases out of three or in all three phases, alternative computation is not carried out in the current selecting means 16. In this case, the drive apparatus is stopped by the target command computing means 10 according to the drive apparatus mode flag 21.

When an error having occurred to current detecting means 8 is restricted only to one phase out of three, the configuration described above allows compensation to be made for the detected value of the affected phase, and permits the drive apparatus operation to continue. Further, if an error has occurred to the current detecting means 8 for two phases out of three or all three phases, steps in conformity to the above-mentioned three-phase equilibrium cannot be taken. In this case, an adequate action can be taken immediately to stop the drive apparatus operation.

FIG. 8 shows an example of three-phase signal evaluation in a controller as a second embodiment of the present invention. Namely, when current detecting means 8 is provided for each of three phases; U-phase, V-phase and W-phase, steps shown in FIG. 8 are taken according to the error evaluation described in FIG. 7.

When all the U, V and W phases are free from any error, mode data 20 is 0. Since current selecting means 16 is normal, no alternative steps are taken. The drive apparatus mode flag 21 is in the state of indicating normal operations. If, for example, evaluation is made to find out that an error has occurred to W-phase current detecting means 8, then error evaluation means 18 sets the mode data to 2, and places the drive apparatus mode flag 21 to the drive limit mode to produce an output. In response to this output, current selecting means 16 generates the alternative W-phase current detection signal instead of W-phase current detection signal 32 of the affected W phase by calculation according to the following equation:

$$Iw=-Iu-Iv \qquad (6)$$

The q-axis current detected value 24 and d-axis current detected value 25 as outputs from three-phase/two phase converting means 14 is permitted by this step to maintain the state before the error occurred, so the operation can be continued. Even if controller operation can be continued, target command computing means 10 recognizes that an error has occurred, hence it takes some restrictive step such as limiting the target command and q-axis current command 22 and d-axis current command 23 to urge an operator to make repairs. Needless to say, no problem is raised by continued operation of the controller.

If an error has occurred to current detecting means 8 of both U and W phases, error evaluation means 18 sets the mode data to 5, and places the drive apparatus mode flag 21 to the drive stop mode to produce an output. In response to this output, current selecting means 16 does not take any step. This is because, if an error has occurred to the current detecting means 8 for two phases out of three, it is not possible to take a step of obtaining the current detection signal of the affected phase by calculation to be carried out in conformity to the above-mentioned three-phase equilibrium (5):

$$Iu+Iv+Iw=0 \qquad (5)$$

In this case, the drive apparatus mode flag 21 is also sent to the target command computing means 10. When this drive apparatus mode flag 21 is set to the drive stop mode, target command computing means 10 immediately resets the target command and q-axis current command 22 and d-axis current command 23, and stops the operation of the electric power converting means 5, thereby suspending the drive of the motor 7. Such a configuration allows the drive of the motor 7 to be stopped immediately when an error has occurred to the current detecting means 8 for two phases out of three or all three phases, and provides an electric car controller characterized by a high degree of reliability.

Figure 9:
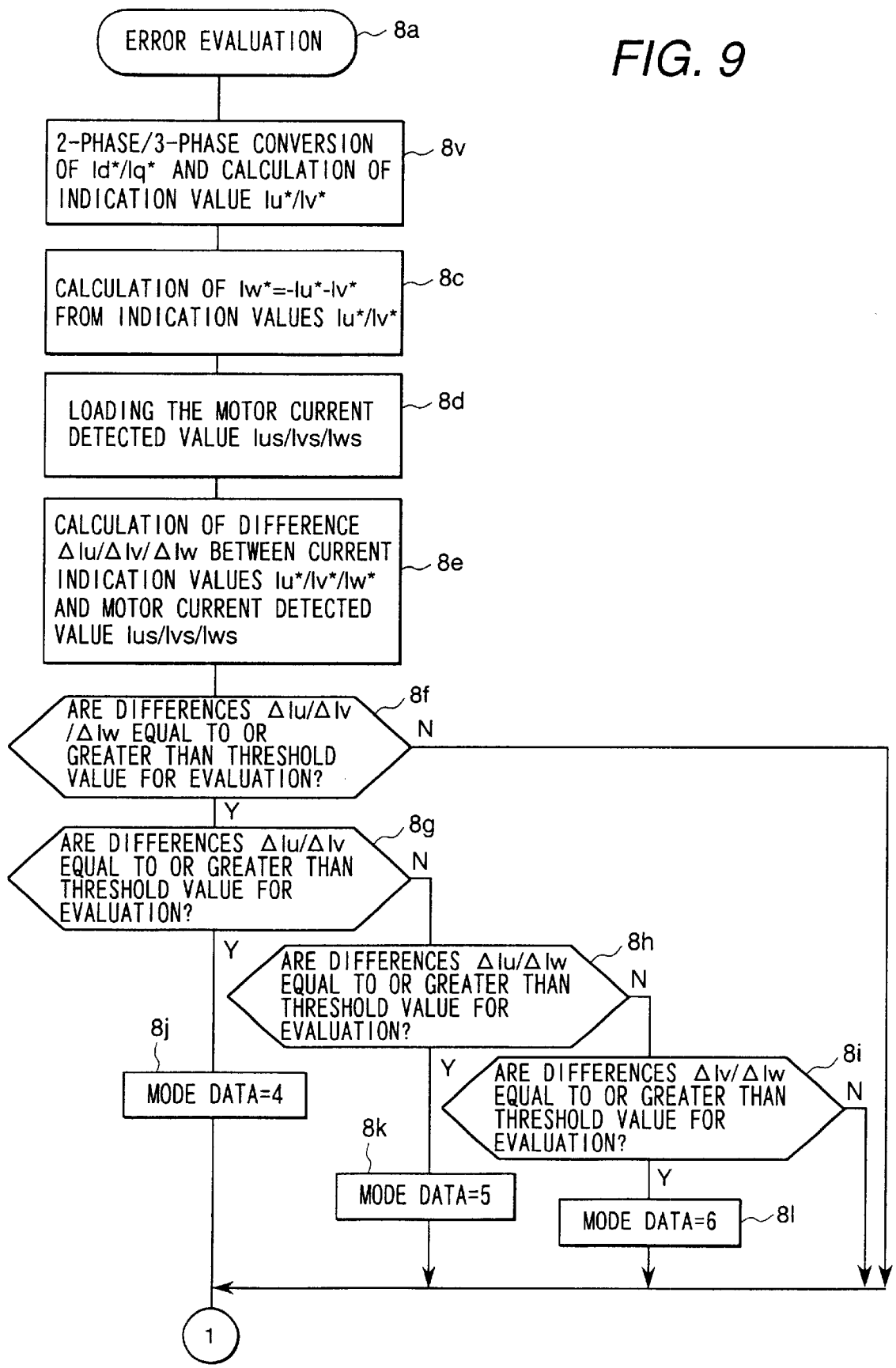
FIG. 9 is a flow chart representing an error evaluation method for three-phase signals in a controller as a second embodiment of the present invention.
Figure 10:
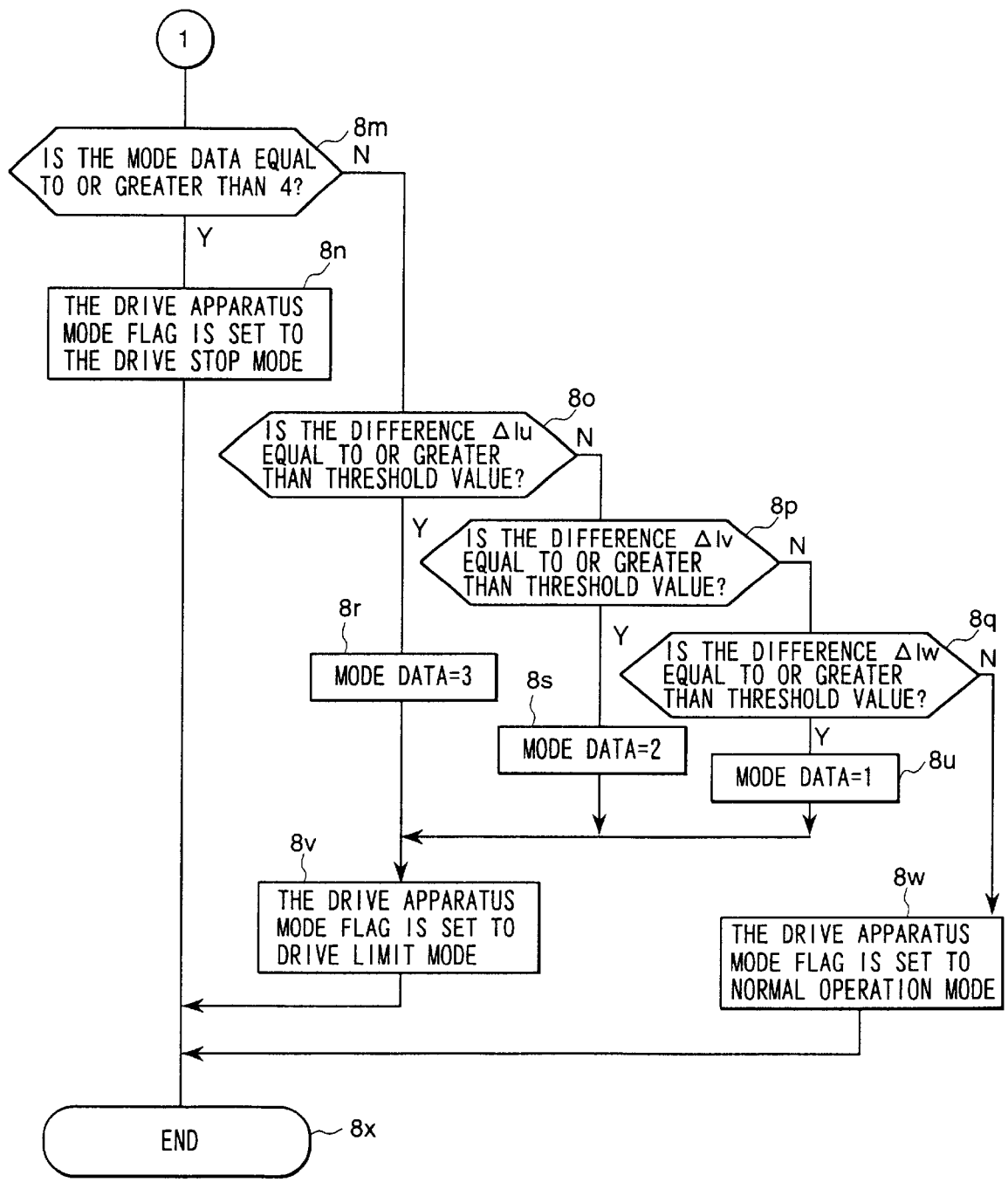
FIG. 10 is a flow chart (continued from FIG. 9) representing an error evaluation method for three-phase signals in a controller as a second embodiment of the present invention.

FIGS. 9 and 10 are flow charts representing an error evaluation method for three-phase signals in a controller as a second embodiment of the present invention.

In step 8b, U-phase evaluation current command value 34 and V-phase evaluation current command value 35 are calculated according to the values of q-axis current command 22 and d-axis current command 23.

In step 8c, the W-phase evaluation current command value 36 is calculated according to the following equation, based on the values of the U-phase evaluation current command value 34 and V-phase evaluation current command value 35:

$$Iw^*=-Iu^*-Iv^* \qquad (7)$$

In the step 8d, the U-phase evaluation current command value 34, V-phase evaluation current command value 35 and W-phase evaluation current command value 36 are loaded based on the signal from the current detecting means 8. In step 8e, difference ΔIu is calculated from the U-phase evaluation current command value 34 and U-phase current detected value 30, difference ΔIv from the V-phase evaluation current command value 35 and V-phase current detected value 31, and difference ΔIw from W-phase evaluation current command value 36 and W-phase current detected value 32.

This calculation can also be made by finding the absolute value of each of the U-phase evaluation current command value 34, V-phase evaluation current command value 35 and W-phase evaluation current command value 36; and U-phase current detected value 30, V-phase current detected value 31 and W-phase current detected value 32. Then the differences are found out between U-phase evaluation current command value 34, U-phase current detected value 30 and V-phase evaluation current command value 35; and V-phase current detected value 31, W-phase evaluation current command value 36 and W-phase current detected value 32. The results can be assigned with ΔIu, ΔIv and ΔIw.

Alternatively, it is also possible to find the absolute value of the result of obtaining the differences of each of the combinations between the U-phase evaluation current command value 34 and U-phase current detected value 30, between the V-phase evaluation current command value 35 and V-phase current detected value 31, and between the W-phase evaluation current command value 36 and W-phase current detected value 32. And the results can be assigned with ΔIu, ΔIv and ΔIw. Alternatively, it is also possible to find out the differences between the U-phase evaluation current command value 34 and U-phase current detected value 30, between the V-phase evaluation current command value 35 and V-phase current detected value 31, and between the W-phase evaluation current command value 36 and W-phase current detected value 32, and the results can be directly assigned to ΔIu, ΔIv and ΔIw, respectively.

In any of the comparison methods, ΔIu, ΔIv and ΔIw are assigned using the average value of multiple results of calculating differences. Alternatively, after the results of computing differences have been treated by a primary delay filter or the like, the results of calculating differences are assigned with ΔIu, ΔIv and ΔIw. This step reduces the possibility of an detection error caused by noise.

The ΔIu, ΔIv and ΔIw obtained in this manner are compared with the threshold value in the step 8f. When the result of comparison with the threshold value is equal to or higher than the threshold value, processing goes to step 8g. If the threshold value is not reached, processing goes to the route ①. To determine if the threshold value is reached or not, it is also possible to integrate the state of an error and to include the number of times or error time in evaluation. When processing goes to step 7g, evaluation can be made to determine that no error has occurred to the current detecting means 8. So in the step 8g and thereafter, evaluation is made to check the phase where the threshold value is exceeded. In the step 8g, evaluation is made to see if ΔIu and ΔIv has exceeded the threshold value. If both of them have exceeded the threshold value, processing goes to step 8j, and the value of mode data 20 is set to "4". Then processing goes to the route ①. In step 8g, if either ΔIu or ΔIv has not exceeded the threshold value, processing goes to step 8h. Evaluation is made to see if ΔIu and ΔIw have exceeded the threshold value or not. If both the ΔIu and ΔIw have exceeded the threshold value, processing goes to step 8k. The value of mode data 20 is set to "5", and processing goes to route ①.

In step 8h, if either the ΔIu or ΔIw has not exceeded the threshold value, proceeding goes to step 8i, and evaluation is made to see if the ΔIv and ΔIw have exceeded the threshold value or not. If both ΔIv and ΔIw have exceeded the threshold value, proceeding goes to the step 8l to sets the mode data 20 to "6", and goes to the route ①.

In the route ①, reference is made to the value of mode data 20 in step 8m. If the value of the mode data 20 is "4" or more, evaluation has been made to determined that an error has occurred to two or more of the U, V and W phases. In this case, proceeding goes to step 8n and the drive apparatus mode flag 21 is set to the drive stop mode to terminate processing. When this drive stop mode flag 21 is set to the drive stop mode, target command computing means 10 resets the target command for driving the motor 7 and takes such steps as resetting of the q-axis current command 22 and q-axis current command 23 so as to stop the operation of the electric power converting means 5 and motor 7. In step 8m, if the data of the mode data 20 is less than "4", evaluation has been made to determine that an error has occurred to one of the three phases. So processing goes to step 8o. After step 8o, evaluation of an error is carried out separately for each of three phases. In step 8o, evaluation is made to determine if ΔIu has exceeded the threshold value. When the ΔIu has exceeded the threshold value, processing goes to step 8r, and the value of mode data 20 is set to "3".

In step 8o, the ΔIu not exceeding the threshold value suggests that no error has occurred to the U phase, so proceeding goes to step 8p, and evaluation is made to see if the ΔIv has exceeded the threshold value. If the ΔIv has exceeded the threshold value, proceeding goes to step 8s, and the value of the mode data 20 is set to "2". In step 8p, the ΔIv not exceeding the threshold value indicates that no error has occurred to the V phase. Processing goes to step 8q, and evaluation is made to see if the ΔIw has exceeded the threshold value. If the ΔIw has exceeded the threshold value, proceeding goes to step 8u, and the value of the mode data 20 is set to "1". If there is no relevance in any of steps 8o, 8p or 8q, there is no error for all three phases. So proceeding goes to step 8w, and the drive apparatus mode flag 21 is set to the normal operation mode, thereby terminating processing.

When an error has occurred to one of the three phases according to the value of mode data 20 as shown in FIG. 8 through above-mentioned steps of evaluation, the signal of the affected phase out of the other two remaining ones is created to show that the operation of the electric car controller can be continued. When an error has occurred to two phases out of three, that error can be immediately detected to stop the electric car controller immediately. This ensures improved reliability of the electric car controller.

Figure 11:
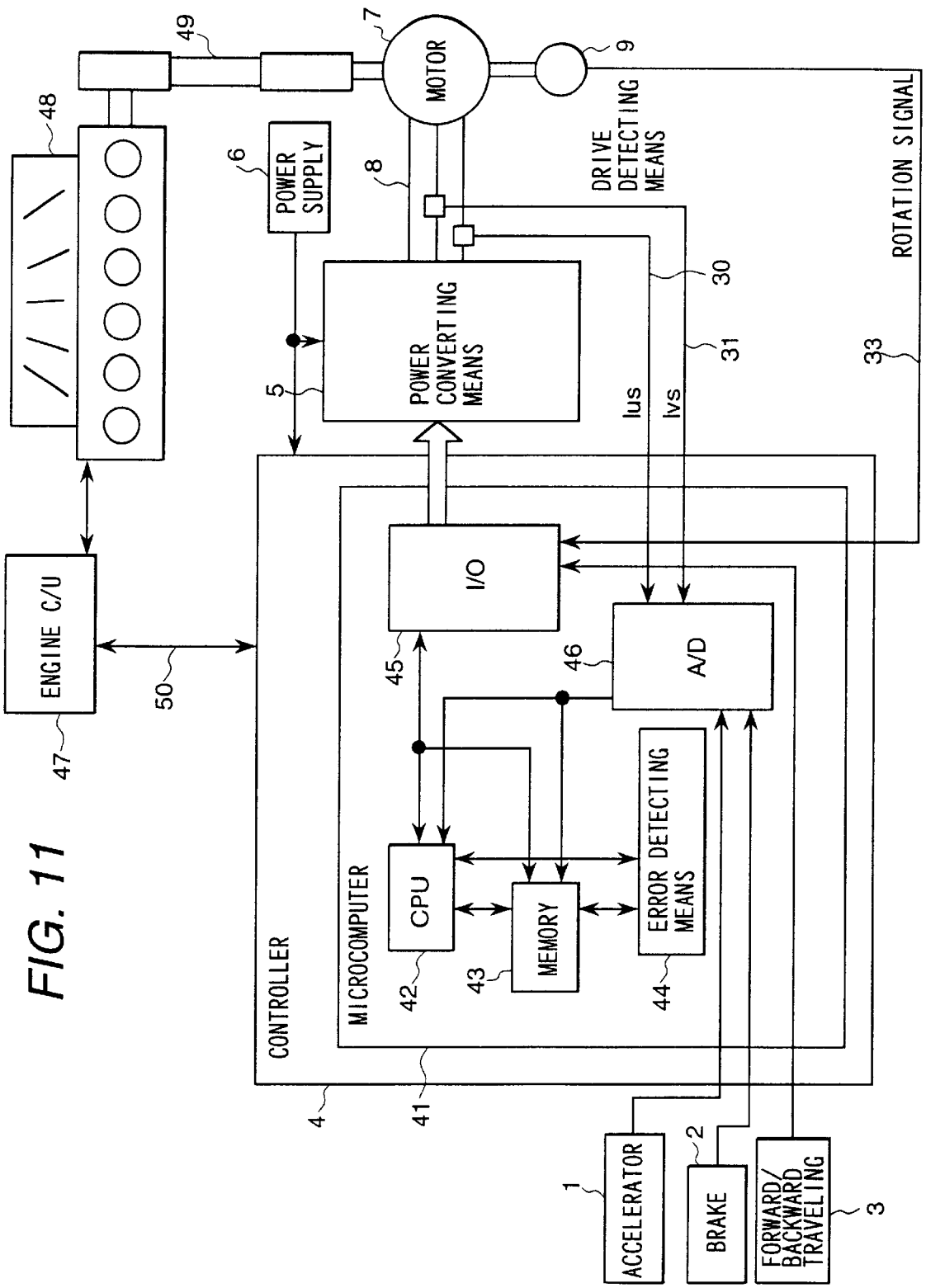
FIG. 11 is a block diagram representing an electric car controller as a third embodiment of the present invention.

FIG. 11 is a block diagram representing an electric car controller as a third embodiment of the present invention. The controller of this embodiment comprises control means 4, electric power converting means 5, power supply 6, motor 7, etc. Control means 4 has a microcomputer 41 comprising a CPU42, memory means 43, input/output means 45 and A/D converting means 46.

The third embodiment of the present invention is provided with an internal combustion engine 48 in addition to the motor 7 for driving the car. The internal combustion engine 48 is controlled by signals from internal combustion engine control means 47. This internal combustion engine control means 47 cooperates with the control means 4 through a communications means 50 to provide control. When this configuration is adopted, a hybrid car can be configured in such a way that control is made by cooperation between the drive force of the motor 7 and drive force of the internal combustion engine 48. The motor 7 is provided with drive detecting means 9 for detecting rotation, and sends the detected rotation as a drive signal 33 to the microcomputer 41.

The microcomputer 41 detects signals from accelerator detecting means 1 and brake detecting means 2 and signals for U-phase current detected value 30 and V-phase current detected value 31 through A/D conversion means 46, and sends them to the CPU42 or memory means 43. Signals from forward/backward travel selecting means 3 and drive detection signal 33 are detected by input/output means 45, and are also sent to the CPU42 or memory means 43.

Based on the sent signals, the CPU42 computes the electric power to be supplied to the motor 7, and drives electric power converting means 5 via input/output means 45. Then electric power of power supply 6 is converted into the electric power to be supplied to the motor 7, and is supplied to the motor 7. In conformity to the supplied electric power, the motor 7 generates drive force, which is sent to the drive force output unit of the internal combustion engine 48 via power transmission means 49 in such a way that the electric car is driven or auxiliary force of the internal combustion engine 48 is generated. Electric power supplied to the motor 7 is detected as current by current detecting means 8, and is sent to the microcomputer 41 as U-phase current detected value 30 and V-phase current detected value 3.

The CPU42 is provided with error detecting means 44, and detects an error in response to the signal from memory means 43 and access from the CPU42. Particularly, it detects an error from current detecting means 8.

Similarly to the first embodiment, this third embodiment allows separate evaluation of an error in each current detecting means 8 even if current detecting means 8 are provided only for two phases out of three, because it is independent of a diagnostic method based on the state of so-called three-phase equilibrium. This eliminates the need of mounting unnecessary current detecting means 8, and provides the effect of cutting down the apparatus cost. Needless to say, this controller as a hybrid car controller can be provided with three current detecting means for all three phases, similarly to the case of the second embodiment.

In an electric car controller, the present invention allows immediately detection of an error which has occurred to current detecting means, and provides a highly reliable electric car controller and method.

The present invention allows separate evaluation of an error in each current detecting means 8 even if current detecting means 8 are provided only for two phases out of three. It permits immediately suspension of the operation of the electric car controller in the event of an error having occurred to current detecting means. This eliminates the need of mounting unnecessary current detecting means 8, and provides the effect of cutting down the apparatus cost, and provides a cost-effective electric car controller and method for the user.

In the present invention, further, the signal of current detecting means for only one phase is eliminated by error evaluation of separate current detecting means when three current detecting means are mounted for three phases, and electric car controller drive can be continued with the remaining two phases, thereby providing an easy-to-use electric car controller and method.

What is claimed:

1. An electric car controller which provides dq-axis vector current control for separate and independent control of primary current to be supplied to a stator of an alternating current motor based on a q-axis control current command value and a d-axis control current command value, and which provides current feedback control by detecting the primary current of said alternating current motor by current detecting means:

said controller comprising;

an operation processing unit for generating a control current command value based on a command value to supply it to said alternating current motor and for performing current feedback control through detection by said current detecting means and conversion by current converting means, and an evaluation processing unit for generating a current command value for evaluation and performing evaluation to see if said current detecting means is normal or not:

said evaluation processing unit characterized by comprising;

a step of generating an evaluation current command value for comparison and evaluation unaffected by said current feedback and independently of said control current command value, based on said q-axis control current command value and said d-axis control current command value using command value converting means, a step of comparing between an alternating current detected value detected by said current detecting means without being converted by said current converting means and said evaluation current command value, and a step of determining that said current detecting means is incorrect if the result of comparison has exceeded a threshold value.

2. An electric car controller according to claim 1 characterized in that;

said operation processing unit comprises target command computing means, current control means, 2-phase/3-phase converting means, PWM generating means, 3-phase/2-phase converting means an electrical angle computing means; and said evaluation processing unit comprises evaluation 2-phase/3-phase converting means, deviation computing means and evaluation means;

said electric car controller further characterized in that said evaluation processing unit compares between the current value detected as current by said current detecting means without being converted by said 3-phase/2-phase converting means and the output from said evaluation 2-phase/3-phase converting means in said deviation computing means.

3. An electric car controller comprising a step of regulating the amplitude and phase of the primary current to be supplied to an alternating current motor and controlling the speed or torque of said alternating current motor, by dq-axis vector current control which provides separate and independent control of the primary current supplied to the stator of said alternating current motor, namely, a q-axis current component as a torque component based on a q-axis control current command value and a d-axis current component as an exciting component based on a d-axis control current command value;

wherein said primary current is applied to said alternating current motor and is controlled by electric power converting means, and said primary current to said alternating current motor is detected as an alternating current detected value by current detecting means:

said controller comprising;

an operation processing unit for generating a control current command value based on a command value to supply it to said alternating current motor and for performing current feedback control, and an evaluation processing unit for generating a current command value for evaluation and performing evaluation to see if said current detecting means is normal or not:

said operation processing unit comprising a step of providing feedback current control by detecting said primary current as a q-axis current detected value and a d-axis current detected value and converting it through current converting means, and by comparing between said q-axis control current command value and said q-axis current detected value, and between said d-axis control current command value and said d-axis current detected value;

said evaluation processing unit characterized by comprising;

a step of generating an evaluation current command value for comparison and evaluation independently of said current command value for feedback control, based on said q-axis control current command value and said d-axis control current command value, using command value converting means, a step of comparing between an alternating current detected value as alternating current component detected by said current detecting means without being converted by said current converting means and said evaluation current command value, and a step of determining that said current detecting means is incorrect if the result of comparison has exceeded a threshold value.

4. An electric car controller according to claim 3 characterized by comprising;

a step of calculating said alternating current detected value and said evaluation current indication value as separate and independent values for each of three phases, a step of comparing between said evaluation current indication value and said alternating current detected value separately and independently for each phase, and a step of identifying and evaluating an error of said current detecting means separately for each phase.

5. An electric car controller according to claim 4 wherein said alternating current detected value is a detected value for any desired two phases out of three, and said evaluation current indication value is calculated for two phases corresponding to each phase of a desired combination of said alternating current detected values, said electric car controller further characterized by comprising;

a step of separate and independent comparison between said 2-phase evaluation current indication value and said alternating current detected value for each phase, a step of identifying and evaluating an error in said current detecting means for any or both of two phases, and a step of suspending the operation of said electric car controller.

6. An electric car controller according to claim 4 wherein said alternating current detected value is a detected value for three phases, and said evaluation current indication value is calculated for three phases corresponding to each phase of said alternating current detected value;

said electric car controller further characterized by comprising;

a step of separate and independent comparison, identification and evaluation of said evaluation current indication value for three phases and said alternating current detected value for each phase, a step of calculating and generating an estimated detection value for said alternating current of an incorrect phase when an error is found in one of three phases, based on said alternating current detected values for remaining two phases, and a step of restricting or continuing the operation of said electric car controller.

7. An electric car controller according to claim 6 wherein, if an error is found in two of three phases or in all the three phases, the operation of said electric car controller is suspended.

8. An electric car controller according to claim 3 characterized in that;

said operation processing unit comprises target command computing means, current control means, 2-phase/3-phase converting means, PWM generating means, 3-phase/2-phase converting means an electrical angle computing means; and said evaluation processing unit comprises evaluation 2-phase/3-phase converting means, deviation computing means and evaluation means;

said electric car controller further characterized in that said evaluation processing unit compares between the current value detected as current by said current detecting means without being converted by said 3-phase/2-phase converting means and the output from said evaluation 2-phase/3-phase converting means in said deviation computing means.

9. An electric car controller according to claim 3 characterized in that;

said operation processing unit comprises target command computing means, current control means, 2-phase/3-phase converting means, PWM generating means, 3-phase/2-phase converting means an electrical angle computing means; and said evaluation processing unit comprises evaluation 2-phase/3-phase converting means, deviation computing means and evaluation means;

said electric car controller further characterized in that said evaluation processing unit compares between the current value detected as current by said current detecting means without being converted by said 3-phase/2-phase converting means and the output from said evaluation 2-phase/3-phase converting means in said deviation computing means.

10. An electric car controller according to claim 5 characterized in that;

said operation processing unit comprises target command computing means, current control means, 2-phase/3-phase converting means, PWM generating means, 3-phase/2-phase converting means an electrical angle computing means; and said evaluation processing unit comprises evaluation 2-phase/3-phase converting means, deviation computing means and evaluation means;

said electric car controller further characterized in that said evaluation processing unit compares between the current value detected as current by said current detecting means without being converted by said 3-phase/2-phase converting means and the output from said evaluation 2-phase/3-phase converting means in said deviation computing means.

11. An electric car controller according to claim 6 characterized in that;

said operation processing unit comprises target command computing means, current control means, 2-phase/3-phase converting means, PWM generating means, 3-phase/2-phase converting means an electrical angle computing means; and said evaluation processing unit comprises evaluation 2-phase/3-phase converting means, deviation computing means and evaluation means;

said electric car controller further characterized in that said evaluation processing unit compares between the current value detected as current by said current detecting means without being converted by said 3-phase/2-phase converting means and the output from said evaluation 2-phase/3-phase converting means in said deviation computing means.

12. An electric car controller according to claim 7 characterized in that;

said operation processing unit comprises target command computing means, current control means, 2-phase/3-phase converting means, PWM generating means, 3-phase/2-phase converting means an electrical angle computing means; and said evaluation processing unit comprises evaluation 2-phase/3-phase converting means, deviation computing means and evaluation means;

said electric car controller further characterized in that said evaluation processing unit compares between the current value detected as current by said current detecting means without being converted by said 3-phase/2-phase converting means and the output from said evaluation 2-phase/3-phase converting means in said deviation computing means.

13. An electric car control method comprising;

a step of regulating the amplitude and phase of the primary current to be supplied to an alternating current motor and controlling the speed or torque of said alternating current motor, by dq-axis vector current control which provides separate and independent control of the primary current supplied to the stator of said alternating current motor, namely, a q-axis current component as a torque component based on a q-axis control current command value and a d-axis current component as an exciting component based on a d-axis control current command value, a step of applying said primary current to said alternating current motor and controlling it through electric power converting means, and a step of detecting said primary current to said alternating current motor an alternating current detected value through current detecting means:

said electric car control method comprising;

a step of providing feedback current control by detecting said primary current as a q-axis current detected value and a d-axis current detected value and converting it through current converting means, and by comparing between said q-axis control current command value and said q-axis current detected value, and between said d-axis control current command value and said d-axis current detected value, a step of generating an evaluation current command value for comparison and evaluation independently of said feedback control current command value based on said q-axis control current command value and said d-axis control current command value, a step of comparing said alternating current detected value as an alternating current component detected by said current detecting means without being converted, and said evaluation current command value, and a step of determining that said current detecting means is incorrect if the result of comparison exceeds a threshold value.

14. An electric car control method according to claim 13 characterized in that the difference to be compared with said threshold value is compared with said threshold value using the average value of the results of multiple difference calculations.

15. An electric car control method according to claim 13 wherein said alternating current detected value is characterized by;

a step of finding the absolute value of each of the evaluation current command value for each of the two phases out of three and current detected value, and a step of obtaining the difference between the current command value for each phase and current detected value, whereby said result is compared with said threshold value.

16. An electric car control method according to claim 13 wherein said alternating current detected value is characterized by;

a step of finding the absolute value of each of evaluation current command value for each of three phases and current detected value, and a step of obtaining the difference between the current command value for each phase and current detected value, whereby said result is compared with said threshold value.

* * * * *